United States Patent
Meredith et al.

(10) Patent No.: US 10,313,351 B2
(45) Date of Patent: Jun. 4, 2019

(54) DYNAMIC PASSCODES IN ASSOCIATION WITH A WIRELESS ACCESS POINT

(71) Applicants: AT&T INTELLECTUAL PROPERTY I, L.P., Atlanta, GA (US); AT&T MOBILITY II LLC, Atlanta, GA (US)

(72) Inventors: Sheldon Kent Meredith, Roswell, GA (US); William Cottrill, Canton, GA (US); Brandon B. Hilliard, Woodstock, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 178 days.

(21) Appl. No.: 15/049,773

(22) Filed: Feb. 22, 2016

(65) Prior Publication Data

US 2017/0244712 A1 Aug. 24, 2017

(51) Int. Cl.
*H04L 29/06* (2006.01)
*H04L 9/32* (2006.01)
(Continued)

(52) U.S. Cl.
CPC .......... *H04L 63/101* (2013.01); *H04L 9/0891* (2013.01); *H04L 9/3228* (2013.01);
(Continued)

(58) Field of Classification Search
CPC .. H04W 12/06; H04L 63/101; H04L 63/0428; H04L 63/108; H04L 63/0846;
(Continued)

(56) References Cited

U.S. PATENT DOCUMENTS 6,341,352 B1 * 1/2002 Child ...................... G06F 21/33
705/69
8,291,470 B2 10/2012 Delia et al.
(Continued)

FOREIGN PATENT DOCUMENTS

CA 2 692 083 A1 12/2008

OTHER PUBLICATIONS

W. A. Arbaugh, N. Shankar, Y. C. J. Wan and Kan Zhang, "Your 80211 wireless network has no clothes," in IEEE Wireless Communications, vol. 9, No. 6, pp. 44-51, Dec. 2002. (Year: 2002).*
(Continued)

*Primary Examiner* — Kari L Schmidt
(74) *Attorney, Agent, or Firm* — Toler Law Group, PC

(57) ABSTRACT

A method includes, after expiration of a first passcode, receiving, at an access point, a first access request from a first device. The first access request may be encrypted based on the first passcode. The method further includes determining whether an identifier of the first device is included in a device list associated with the first passcode. The device list includes identifiers of devices that accessed the access point using encryption based on the first passcode before the expiration of the first passcode. The method also includes, in response to a determination that the identifier of the first device is included in the device list generating, at the access point, data representing a second passcode by encrypting the second passcode using the first passcode. The method further includes sending the data representing the second passcode to the first device from the access point.

20 Claims, 7 Drawing Sheets

(51) Int. Cl.
*H04L 9/08* (2006.01)
*H04W 12/06* (2009.01)
*H04W 12/08* (2009.01)

(52) U.S. Cl.
CPC ........ *H04L 9/3268* (2013.01); *H04L 63/0428* (2013.01); *H04L 63/0838* (2013.01); *H04L 63/0846* (2013.01); *H04L 63/108* (2013.01); *H04W 12/06* (2013.01); *H04W 12/08* (2013.01); *H04L 2463/062* (2013.01)

(58) Field of Classification Search
CPC . H04L 63/0838; H04L 9/3228; H04L 9/3268; H04L 9/0891
See application file for complete search history.

(56) References Cited

U.S. PATENT DOCUMENTS

| | | | |
|---|---|---|---|
| 8,484,707 B1* | 7/2013 | Bertz | B60R 25/24 705/65 |
| 8,881,249 B2 | 11/2014 | Nunn et al. | |
| 9,344,883 B2* | 5/2016 | Perry | H04W 12/06 |
| 9,363,745 B2* | 6/2016 | Balasubramanian | H04W 48/20 |
| 2005/0060412 A1 | 3/2005 | Chebolu et al. | |
| 2005/0210267 A1 | 9/2005 | Sugano et al. | |
| 2005/0240843 A1 | 10/2005 | Steinmann et al. | |
| 2005/0251498 A1* | 11/2005 | Steinmann | G06F 21/10 |
| 2007/0124807 A1 | 5/2007 | Jau | |
| 2007/0174901 A1* | 7/2007 | Chang | H04L 63/0846 726/5 |
| 2009/0097459 A1* | 4/2009 | Jendbro | H04L 63/0838 370/338 |
| 2009/0129291 A1* | 5/2009 | Gupta | H04W 8/26 370/254 |
| 2010/0174758 A1 | 7/2010 | Radenkovic et al. | |
| 2011/0093913 A1* | 4/2011 | Wohlert | H04L 63/101 726/1 |
| 2013/0347093 A1* | 12/2013 | von Krogh | G06F 21/34 726/9 |
| 2014/0189808 A1 | 7/2014 | Mahaffey et al. | |
| 2014/0201536 A1* | 7/2014 | Fiske | H04L 9/0844 713/183 |
| 2014/0214688 A1 | 7/2014 | Weiner et al. | |
| 2015/0026796 A1 | 1/2015 | Alan et al. | |
| 2015/0089619 A1 | 3/2015 | Manza et al. | |
| 2015/0244714 A1 | 8/2015 | Kundu et al. | |
| 2017/0041151 A1* | 2/2017 | Kommireddy | H04L 9/006 |

OTHER PUBLICATIONS

Housley, Russ, and William Arbaugh. "Security problems in 802.11-based networks." Communications of the ACM 46.5 (2003): 31-34. (Year: 2003).*

Aman, W., et al., "Event Driven Adaptive Security in Internet of Things", UBICOMM, 2014, http://www.researchgate.net/profile/Waqas_Aman/publication/265786485_Event_Driven_Adaptive_Security_in_Internet_of_things/links/54f6ca370cf2ca5efeff3f45.pdf, 9 pages.

Butkus, P. "Identity Management in M2M Networks", Diss. Aalto University, 2014, https://aaltodoc.aalto.fi/bitstream/handle/123456789/13875/master_Butkus_Pranas_2014.pdf?sequence=1, 99 pages.

Rotondi, D., et al., "Managing Access Control for Things: a Capability Based Approach", Proceedings 7th Int. Conf. on Body Area Networks, Institute for Computer Sciences, Social-Informatics and Telecommunications Engineering, 2012, 6 pages.

* cited by examiner

DYNAMIC PASSCODES IN ASSOCIATION WITH A WIRELESS ACCESS POINT

FIELD OF THE DISCLOSURE

The present disclosure is generally related to dynamic passcodes in association with a wireless access point.

BACKGROUND

An access point for a local area network (LAN) may provide security for the LAN. The access point may use a security protocol (e.g., Wi-Fi Protected Access II (WPA2) protocol). The security protocol may enable encrypted communication between a device and the access point based on a passcode known to the device and to the access point. An administrator of the LAN may provide the passcode to the access point. The administrator may also provide the passcode to one or more devices that are to have wireless access to the LAN. When the device is in an access range of the access point, the device may use a handshake procedure to establish a session with the access point that enables the device to securely communicate with the access point.

An administrator associated with the access point of the LAN may set an initial passcode. Typically, the administrator does not subsequently change the passcode. Not changing the passcode may provide a long period of time during which one or more bad actors may attempt to crack the passcode. Should a bad actor crack the passcode, the bad actor may have access to content of subsequent communications transmitted via the access point. The administrator may change the passcode to a new passcode at any time, but the administrator may not change the passcode because of an inconvenience of having to provide the new passcode to each device that is to be allowed access to the LAN.

DETAILED DESCRIPTION

Figure 1:
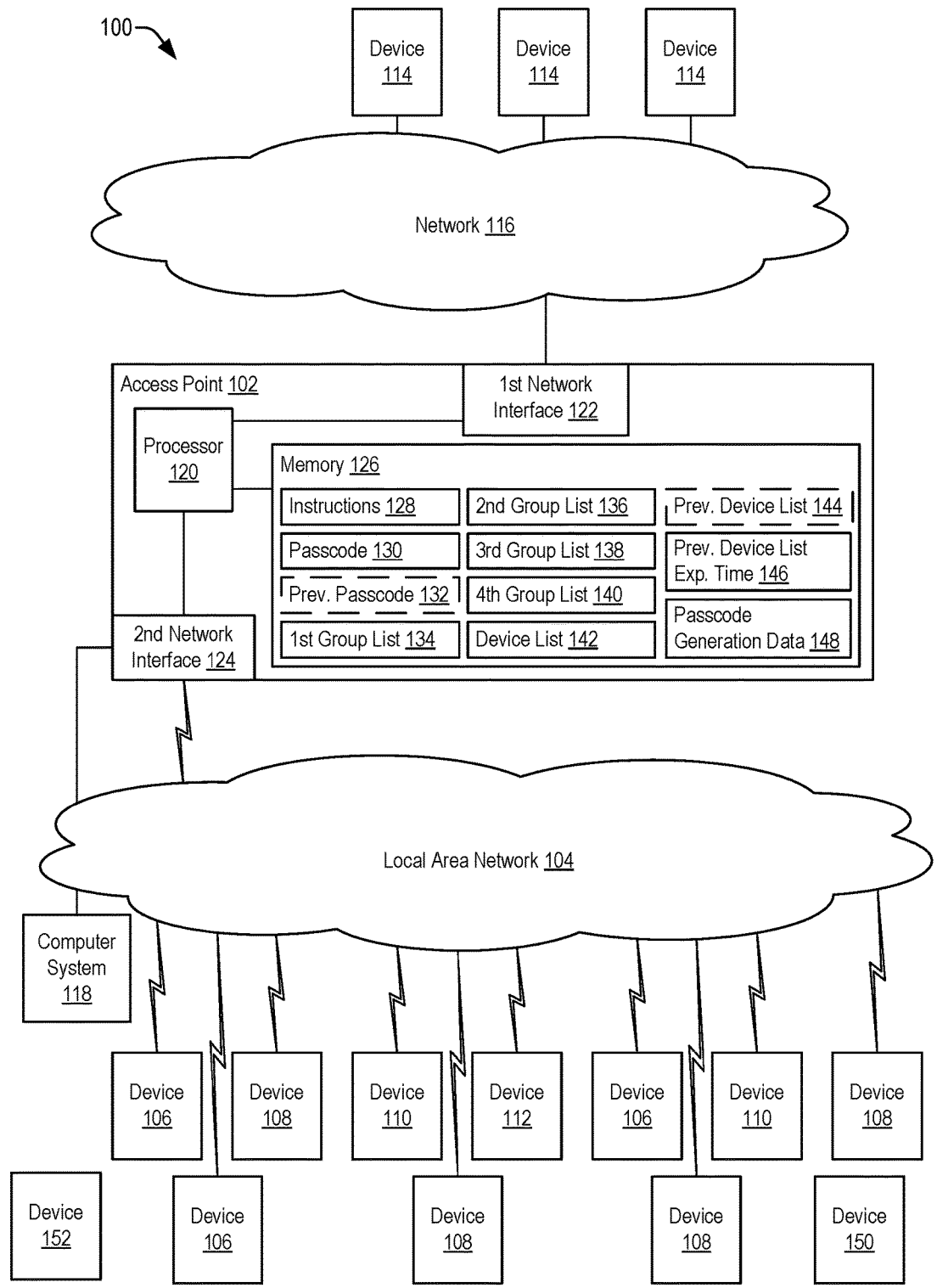
FIG. 1 is a block diagram of a system with a wireless LAN that is secured by a wireless access point that utilizes dynamic passcodes.

Systems and methods disclosed herein enable devices assigned to particular classes to access a LAN secured by an access point that utilizes dynamic passcodes after the access point changes a previous passcode to a new passcode. An administrator of the LAN may designate devices with access to the network as belonging to a first class of devices, a second class of devices, a third class of devices. The first class of devices may correspond to devices that are trusted devices (e.g., devices associated with people that the administrator trusts to appropriately use the LAN). The second class of devices may correspond to devices that are most trusted (or indefinitely trusted) devices (e.g., devices associated with the administrator, the LAN, or both). The third class of devices may correspond to devices that are untrusted, such as devices that are denied access to the LAN (e.g., blacklisted devices) or devices that may temporarily access the LAN, but have no access privileges that extend after changing of a passcode. Devices in the first class and devices the second class may be able to access the LAN after the access point changes to a new passcode without the passcode being manually provided with the new passcode. Some devices in the third class may access the LAN until the access point changes to the new passcode, but the devices are not automatically provided the new passcode.

In a particular embodiment, the access point may occasionally or periodically change the passcode. In this embodiment, the access point may send an encrypted version of the new passcode to at least some of the devices of the first class. For example, if a device attempts to access the LAN within a particular time period after a previous passcode becomes invalid, the access point may determine whether an identifier of the device is included in a first trusted device list, where the first trusted device list includes identifiers of devices in the first class. If the device is identified in the first trusted device list, the access point may send data to the device, where the data includes the new passcode encrypted using the previous passcode. The device may then decrypt the data using the previous passcode to retrieve the new passcode.

To reduce the risk of another device pretending to be a trusted device of the first class, after generating a new passcode, the access point may maintain a device list that identifies devices of the first class that have accessed the LAN within a first time period (e.g., 30 days). If a particular device that is on the device list sends a first request to access the LAN using the previous passcode, the access point may send the new passcode (as described above) and may remove the identifier of the particular device from the device list. Subsequently, if the access point receives a second request to access the LAN that includes the identifier of the particular device, the access point will not send the new passcode in response to the second request because the identifier of the particular device is no longer on the device list (having been removed after the access point responded to the first request). As further security, the access point may delete (or otherwise render the device list inaccessible or invalid) the device list after a second time period has passed (e.g., 2 days). After the device list is deleted, the new passcode is not provided to devices of the first class. For example, if a device of the first class has not received the new passcode before expiration of the device list, the device may be unable to access the LAN until the device is manually provided with the new passcode (e.g., by the administrator of the LAN).

The access point may send passcode generation data to each device of the second class of devices in response to an administrator designating the device as belonging to the second class. The passcode generation data enables a device that received the passcode generation data to generate a valid new passcode from the previous passcode. When the access point changes the previous passcode to the new passcode, devices in the second class may use the passcode generation data to generate the new passcode and may access the LAN by sending an access request encrypted based on the new passcode.

The ability of the access point to utilize dynamic passcodes may increase security of the LAN as compared to an access point that uses a static passcode. For example, using dynamic passcodes may reduce an amount of time available for a person to attempt to hack the passcode for the LAN. Additionally, supporting automatic distribution of new passcodes (as described above) may reduce an amount of time and effort required of an administrator of the LAN to distribute new passcodes. As internet-of-things devices become more common, a number of devices connected to a LAN may increase substantially. Further, many internet-of-things devices are relatively simple, with few user interface devices, which can make provisioning passcodes to such devices time consuming. The ability of devices in the first class and the second class to obtain a new passcode without needing to manually receive the new passcode may reduce a burden associated with an access point that utilizes dynamic passcodes, especially in a LAN that supports numerous internet-of-things devices.

In an illustrative embodiment, a method includes, after expiration of a first passcode, receiving, at an access point, a first access request from a first device. The first access request may be encrypted based on the first passcode. The method further includes determining whether an identifier of the first device is included in a device list associated with the first passcode. The device list includes identifiers of devices that accessed the access point using encryption based on the first passcode before the expiration of the first passcode. The method also includes, in response to a determination that the identifier of the first device is included in the device list, generating, at the access point, data representing a second passcode by encrypting the second passcode using the first passcode. The method further includes sending the data representing the second passcode to the first device from the access point.

In an illustrative embodiment, a system includes a processor and a memory coupled to the processor. The memory includes instructions executable by the processor to perform operations. The operations include, after expiration of a first passcode, receiving, from a first device, a first access request to access a local area network. The first access request may be encrypted based on the first passcode. The operations also include determining whether an identifier of the first device is included in a device list associated with the first passcode. The device list includes identifiers of devices that accessed the local area network using encryption based on the first passcode before the expiration of the first passcode. The operations further include, in response to a determination that the identifier of the first device is included in the device list, generating data representing a second passcode by encrypting the second passcode using the first passcode. The operations also include sending the data representing the second passcode to the first device.

In an illustrative embodiment, a processor-readable storage device stores instructions, that when executed by a processor of an access point, cause the processor to perform operations. The operations include, after expiration of a first passcode, receiving a first access request from a first device. The first access request may be encrypted based on the first passcode. The method further includes determining whether an identifier of the first device is included in a device list associated with the first passcode. The device list includes identifiers of devices that accessed the access point using encryption based on the first passcode before the expiration of the first passcode. The method also includes, in response to a determination that the identifier of the first device is included in the device list generating data representing a second passcode by encrypting the second passcode using the first passcode. The method further includes sending the data representing the second passcode to the first device.

FIG. 1 is a block diagram that illustrates a particular embodiment of a system 100 for implementing dynamic passcodes in association with a wireless access point 102. The wireless access point 102 may be a customer premises device, router, other device, or combinations thereof, that supports a LAN 104 and provides authorized devices 106-112 coupled to the LAN 104 with access to other devices (e.g., one or more devices 114 (e.g., content sources, network devices, end user communication devices, other devices, or combinations thereof) coupled to the access point 102 via a network 116 or to other authorized devices 106-112 coupled to the LAN 104. The network 116 may include one or more public networks (e.g., the internet), one or more private networks (e.g., media content distribution systems), one or more mobile communication networks, or combinations thereof. The access point 102, the LAN 104, or both may be associated with a service provider, an individual, a household, a business, another entity, or combinations thereof.

The devices 106-112 may be able to communicate wirelessly with the access point 102. The devices 106-112 may include internet-of-things devices, such as sensors, controllers (e.g., thermostats, lighting controllers), appliances (e.g., "smart" refrigerators), other internet-or-things devices, or combinations thereof. The devices 106-112 may include stationary devices, mobile devices, or both. To illustrate, the devices 106-112 may include, but are not limited to, mobile communication devices (e.g., mobile telephones), tablet computers, laptop computers, appliances (e.g., refrigerators, washers, dryers, air conditioning and heating systems, alarm systems, lighting systems, etc.), communication systems in vehicles (e.g., a portion of a video system in a car that is able to receive media content stored by a media device in a household when coupled to the media device via the LAN 104), medical devices, location monitors, clocks, other wireless communication devices, or combinations thereof. In the embodiment depicted in FIG. 1, three devices 106, four devices 108, two devices 110, and one device 112 are coupled to the access point via the LAN 104 at a particular time. At other times and in other embodiments, fewer or more devices 106-112 may be coupled to the access point 102 via the LAN 104.

An administrator associated with the access point 102 may be able to change settings associated with the access point 102 and may be able to assign particular devices to particular device classes. The administrator may be associated with a computer system 118 that is coupled by a wired connection to the access point 102. Alternately or in addition, the administrator may be associated with a device 112 that is wirelessly coupled to the access point via the LAN 104. The device 112 may include or correspond to a portable device (e.g., a mobile communication device, a tablet, a laptop computer, etc.). The computer system 118, the device 112, or both, may be referred to as an administrator device, which enables the administrator to control settings and data associated with the access point 102.

The administrator device may include a processor and instructions executable by the processor to display a current passcode for the LAN 104. For security, the instructions may require authentication (e.g., entry of a password, a fingerprint scan, entry of other biometric data, or combinations thereof) before the current passcode is displayed. Enabling the administrator device to display the current passcode for the LAN 104 may enable the administrator to easily obtain the current passcode for entry as input to another device that is to be granted access to the LAN 104 (e.g., manual provisioning of the current passcode).

The access point 102 may include one or more processors (such as a processor 120), one or more network interfaces (such as a first network interface 122 and a second network interface 124), and a memory 126. The processor 120 may communicate with one or more of the devices 114 via the network 116 utilizing the first network interface 122. The processor 120 may communicate with the one or more devices 106-112 via the LAN 104 utilizing the second network interface 124.

The memory 126 may store settings associated with the access point 102 and the LAN 104, data, and instructions 128. The settings and data may include, but are not limited to, a type of security protocol to implement; access restrictions associated with particular devices; information associated with frequency of passcode changes; one or more passcodes 130, 132; one or more group lists 134-144; a previous device list expiration time 146; passcode generation data 148, other information, or combinations thereof.

The instructions 128 may be executable by the processor 120 to perform operations. The operations may include providing security for the LAN 104 utilizing dynamic passcodes. For example, a first passcode for the LAN 104 may expire after a first period of time, and the instructions 128 may cause the processor 120 to generate a second passcode to replace the first passcode. The second passcode also expire after a second period of time. The second period of time may be of the same duration as the first period of time, or the second period of time may have a different duration than the first period of time. Having non-static passcodes that expire and are replaced by new passcodes may significantly decrease a risk of a bad actor having access to the LAN 104.

The passcode 130 may be changed in response to a passcode change request received from an administrator associated with the LAN 104, at a random or quasi-random time selected by the processor 120, periodically (e.g., after passage of two weeks, a month, two months, or some other amount of time), based on detection of an event (such as a particular number of failed access requests), or combinations thereof.

The memory 126 may store one or more group lists, such as a first group list 134, a second group list 136, a third group list 138, and a fourth group list 140. The first group list 134 may include or correspond to a first trusted devices list, which includes identifiers and other information associated with one or more devices 106 designated by an administrator as being trusted devices (e.g., devices of the first class as described above). The second group list 136 may include or correspond to a second trusted devices list, which includes identifiers and other information associated with one or more devices 108 designated by an administrator as being indefinitely trusted devices (e.g., devices of the second class as described above). The third group list 138 may include or correspond to a blacklist, which includes identifiers and other information associated with one or more devices 150 designated by an administrator as not being allowed to utilize the LAN 104 (e.g., black-listed devices). Although one or more devices 150 may not be able to use the LAN 104, the one or more devices 150 may be able to communicate with devices 106-112 wirelessly coupled to the LAN 104 via the network 116. The fourth group list 138 may include identifiers and other information associated with one or more devices 110. The one or more devices 110 may include devices that have access the LAN 104 at a particular moment (e.g., have the current passcode), but have not been assigned to the first class or to the second class (e.g., are not identified in the first device list 134 and are not identified in the second device list 136). An identifier associated with a device 112 associated with an administrator may be stored in the first group list 134 or the second group list 136 based on a designation made by the administrator.

The memory 126 may include fewer group lists (e.g., the memory may not include the third group list 138 when there are no devices 150 designated as blacklisted devices) or additional group lists associated with other identified groups or subgroups. For example, the memory 126 may store a fifth group list of identifiers and other information for devices that once had valid access to the LAN 104, but no longer have valid access and are not included in the third group list 138. As another example, the memory 126 may store a sixth group list of identifiers and other information (e.g., access attempt times) of devices that made invalid attempt to access the LAN 104 and do not have identifiers included in one of the group lists 134-140 or the fifth group list. Entries in the fifth group list may be deleted after a particular period of time (e.g., 1 month, 6 months, a year, or other period of time). The fifth group list may simplify identification of a particular device in the event that the particular device subsequently obtains the passcode 130 after being included in the fifth group list. The sixth group list may enable an administrator to more identify and blacklist devices that are inappropriately attempting to access the LAN 104.

The identifiers of the devices 106, 108, 112, 150 in the group lists 134-140 may include media access control (MAC) addresses or other identifiers unique to particular devices. The group lists 134-140 may also include other information that enables the one or more administrators to easily identify a particular device (e.g., a name assigned to the particular device, a time when the particular device first accessed the LAN 104, a time when the device most recently accessed the LAN 104, other information, or combinations thereof). For example, the other information for a first device may include user input (e.g., Linda's Telephone) provided by a user associated with the first device in response to a prompt from the access point 102. To illustrate, when the first device accesses the LAN 104, if the identifier of the first device is not included in one of the group lists 134-140, the access point 102 may cause the prompt to be displayed at the first device. As another example, the other information for a second device may include user input from an administrator that identifies the second device (e.g., AC Controller). The user input may be entered when the administrator edits an entry of the fourth group list 140. The administrator may identify the second device based on a time in the entry that shows when the second device first accessed the LAN 104.

The memory 126 may store the passcode 130 (e.g., the current passcode) for the LAN 104 and a device list 142 associated with the passcode 130. The device list 142 may store identifiers of devices 106 that have identifiers in the first group list 134 and that have accessed the LAN 104 during a time period when the passcode 130 is valid.

The memory 126 may temporarily store a previous passcode 132 that is no longer valid and a previous device list 144 associated with the previous passcode 132. The previous device list 144 may store identifiers of devices in the first class (e.g., devise that have identifiers included in the first group list 134) that accessed the access point 102 via the LAN 104 during a time period when the previous passcode 132 was valid and that have not accessed the LAN 104 during a second time period. The second time period corresponds to a time period starting when the previous passcode 132 became invalid and ending at the previous device list expiration time 146. The previous device list expiration time 146 may correspond to a particular time (e.g., one day, two days, three days, or some other time) after the previous passcode 132 became invalid.

During the second time period, a particular device with an identifier included in both the first group list 134 and the previous device list 144 may send an access request that is encrypted based on the previous passcode 132 to the access point 102. The access point 102 may determine that the access request is not encrypted based on the passcode 130 and may then determine whether that the access request is encrypted based on the previous passcode 132. When the access request is not encrypted based on the previous passcode 132, the access point 102 denies the access request. When the access request is encrypted based on the previous passcode 132, the access point 102 may determine whether the identifier of the particular device is included in the previous device list 144. When the identifier is not included in the previous device list 144, the access point 102 may deny the access request.

When the identifier is in the previous device list 144, the access point 102 may delete the identifier from the previous device list 144 and send data representing the passcode 130 to the particular device. For example, the data representing the passcode 130 may include the passcode 130 encrypted based on the previous passcode 132. To send the data, the access point 102 may establish a limited session with the particular device. During the limited session, the access point 102 may send the particular device the data and a command to replace the previous passcode with the passcode encrypted in the data. After the access point 102 sends the data and the command, the access point 102 may end the session. In response to the data and the command, the particular device may decrypt the passcode 130 (using the previous passcode 132), replace the previous passcode 132 with the passcode 130 in a memory of the particular device, and send a second access request to the access point 102 encrypted based on the passcode 130.

After sending data including the passcode 130 to a device, the access point 102 may delete an entry associated with the device from the previous device list 144. This reduces the risk that another device will "spoof" the particular device to obtain the passcode 130. At an end of the second time period (e.g., when the previous device list expires), the previous device list 144 may only include identifiers of trusted devices (e.g., devices identified in the first group list 134) that have not have attempted to connect to the access point 102 since the previous passcode 132 was changed. The processor 120 may modify the first group list 134 to remove identifiers of these devices (e.g., devices that did not attempt to connect to the access point 102 between expiration of the previous passcode 132 and expiration of the previous device list 144). The processor 120 may also delete the previous passcode 132 and the previous device list 144 from the memory 126. If a particular device sends an access request encrypted based on the previous passcode 132 to the access point 102 after the end of the second period of time (i.e., after the previous device list expiration time 146), the access point 102 denies the request. Removing remaining entries in the previous device list 144 from the first group list 134 may indicate that devices corresponding to the entries are no longer considered to be trusted devices. If one of these devices subsequently try to access the LAN 104, a user of the device may need to obtain the passcode 130 for the LAN 104 from an administrator or another source before being allowed to access the LAN 104.

The memory 126 may also include passcode generation data 148. The instructions 126 may include instructions executable by the processor 120 to generate a new passcode based on the passcode generation data 148. The passcode generation data 148 may include coefficients of a polynomial (or other mathematical operation) that are applied to the previous passcode to generate the new passcode. At or proximate to a time when the passcode 130 becomes invalid, the passcode 130 may be stored as the previous passcode 132, the device list 142 may be stored as the previous device list 144, and the entries in the device list 142 may be deleted. Additionally, a new passcode may be generated by the processor 120 using the passcode generation data 148. The new passcode may be saved as the passcode 130. A new first entry in the device list 142 may be saved when a particular device with an identifier included in the first group list 134 sends an access request to the access point encrypted based on the passcode 130 during a time period when the passcode 130 is valid.

When an administrator uses the computer system 118 or the device 112 to include a particular device in the second group list 136, the access point may send the passcode generation data 148 (or data or instructions corresponding to the passcode generation data 148) to the particular device. The passcode generation data 148 may enable the particular device to generate a valid passcode when one or more conditions are met. In an embodiment, the particular device may use the passcode generation data 148 to generate a new passcode at particular time intervals from an initial time. The particular device may be able to use a valid passcode based on a current time.

In another embodiment, the particular device may use the passcode generation data 148 to generate a new passcode after a first threshold number of consecutive access requests (e.g., three, four, five, or another number of consecutive access requests) are denied by the access point 102. The particular device may determine that a particular access request was denied when the access point 102 does not establish a session with the particular device. If the particular device is not granted access to the LAN 104 after a first threshold number of access requests encrypted based on the new passcode, the particular device may use the passcode generation data 148 to change to a new passcode. After the particular device unsuccessfully tries to access the LAN 104 based on new passcodes a second threshold number of times, the particular device may stop generating new passcodes and may send a notification to a user of the particular device that request that the user to obtain a currently valid password for the LAN 104.

In the example illustrated in FIG. 1, a device 152 may initially not have access to the LAN 104. The device 152 may detect the LAN 104 and provide a user with an option to connect to the LAN 104. When a user of the device 152 selects the option, the user may be prompted for the passcode 130 of the LAN 104. The user may obtain the passcode 130 from an administrator or another source (e.g., a memory card, etc.). The user may enter the passcode (e.g., manually provision the passcode 130) to enable the device 152 to access to the LAN 104. In response to the device 152 gaining access to the LAN 104, the access point 102 may add an identifier of the device 152 to the fourth group list 140. The access point 102 may cause a prompt to be displayed at the device 152 to request identifying information about the device 152, the user, or both. The access point 102 may send a notification to an administrator of the LAN. The notification may inform the administrator that the device 152 has access to the LAN 104 and may offer the administrator options to assign the device 152 to a class (e.g., to add an identifier of the device 152 to one of group lists 134-138). The administrator may select a particular option to assign the device 152 to a class, or the administrator may ignore the options so that the identifier of the device 152 is not included in any of the group lists 134-138. When the device 152 is not assigned to one of the group lists 134, 136, the device 152 may not be able to access the LAN 102 after the access point 102 changes the passcode 130 to a new passcode, unless the new passcode is manually provided to the device 152.

Thus, the system 100 of FIG. 1 enables the access point 102 to utilize dynamic passcodes to secure the LAN 104. When the access point 102 changes the passcode of the LAN 104 to a new passcode, the devices 106, and other devices with identifiers included in both the first group list 134 and the previous device list, may be able to receive the new passcode (encrypted using the previous passcode) from the access point 102 before the previous device list expiration time 146. The devices 106 and the other devices may decrypt the new passcode, store the new passcode in memory, and send access request encrypted based on the new passcode 130. Also, devices 108, and other devices with identifiers included in the second group list 136, may be able to generate the new passcode and gain access to the LAN 104.

Figure 2:
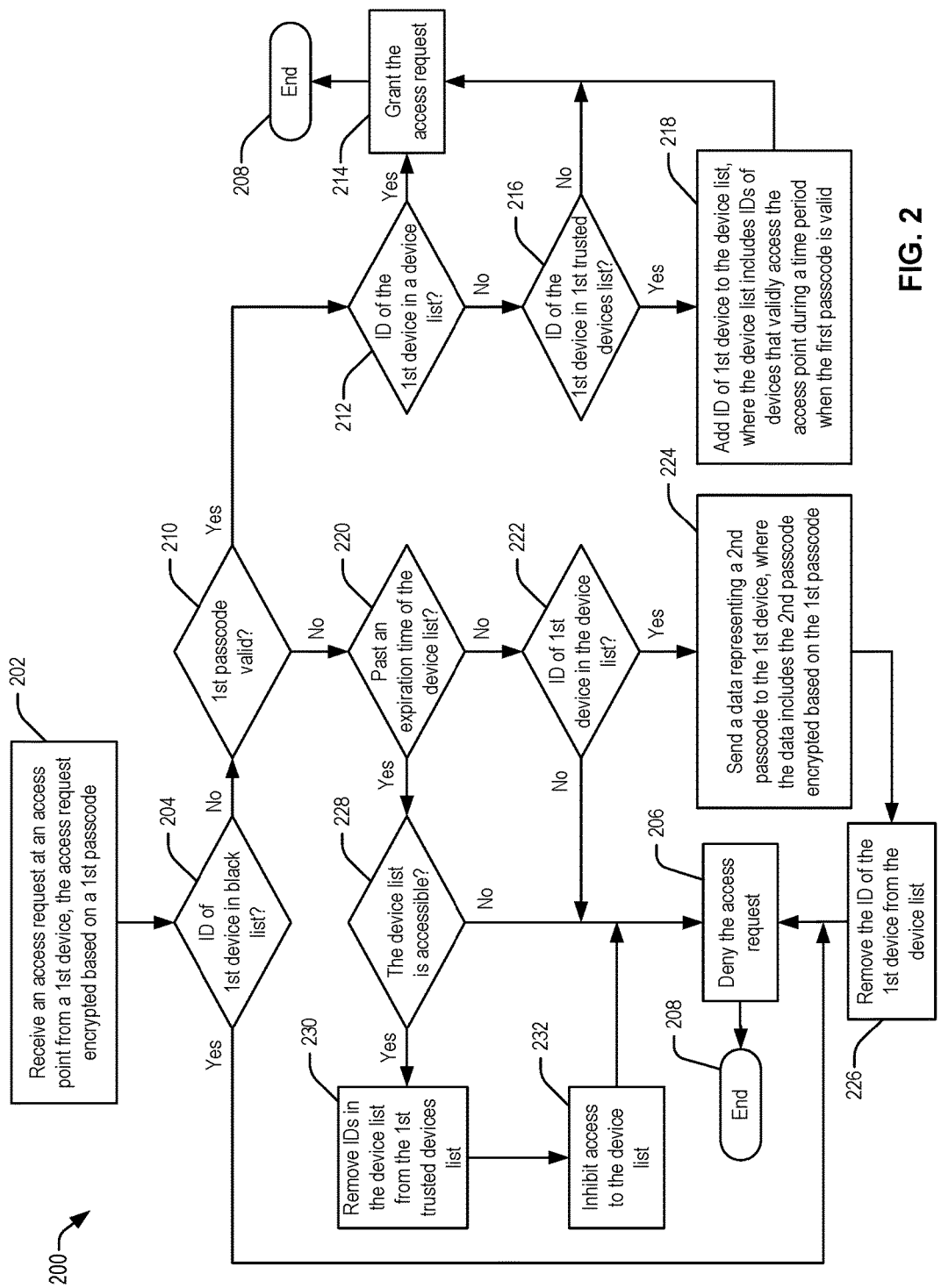
FIG. 2 is a flowchart of a first embodiment of a method of use of a wireless LAN that is secured by a wireless access point that utilizes dynamic passcodes.

Referring to FIG. 2, a flowchart of a first embodiment of a method 200 of use of a wireless LAN that is secured by an access point that utilizes dynamic passcodes is shown. The method 200 may be performed by the access point 102 of FIG. 1. The access point may receive an access request from a first device, at 202. For example, the access request may be included in a wireless transmission that is encrypted using a first passcode. The access request may be received during a handshake procedure (e.g., a four way handshake according to an Institute of Electrical and Electronics Engineers (IEEE) 802.11i specification).

The access point may decrypt the access request and determine whether an identifier of the first device is in a blacklist, at 204. The identifier may include a media access control (MAC) address of the first device, another identifier of the first device (e.g., a user assigned name), or combinations thereof. The blacklist may be a list of identifiers of devices that are not allowed to use the access point. For example, the blacklist may include or correspond to the third group list 138 of FIG. 1. When the identifier of the first device is in the blacklist, the access point may deny the access request, at 206. The method may then end, at 208.

When the identifier of the first device is not in the blacklist, at 204, or when the access point does not have a blacklist, the access point may determine whether the first passcode is valid (e.g., corresponds to the current passcode used by the access point), at 210. When the first passcode is valid, the access point may determine whether the identifier of the first device is in a device list, at 212. The device list includes identifiers of trusted devices (e.g., devices identified in the first group list 134 of FIG. 1) that accessed the access point during a time period when the first passcode is valid. When the identifier of the first device is in the device list, the access point may grant the access request, at 214. Granting the access request may include establishing a session between the first device and the access point. Granting the access request may also include sending a group temporal key from the access point to the first device. The group temporal key may be used by the first device to decrypt multicast and broadcast traffic. A new session may be established after expiration of a preset period of time (e.g., after a first particular time period when the session is idle or after a second particular time period from initiation of the session). The method 200 may then end, at 208.

When the first device is determined not to be in the device list, at 212, the access point may determine whether to add the first device to the device list. For example, the access point may determine whether the first device is a trusted device (e.g., whether an identifier of the first device is in the first group list), at 216. As described above, the first group list may include identifiers of devices designated as trusted devices by the administrator of the local area network. To illustrate, the devices in the first group list may include devices that are likely to frequently use the access point but are not associated with the administrator or the access point. When the first device is not in the first group list, the access point may grant the access request, at 214, without adding the first device to the device list. The method 200 may then end, at 208.

When the identifier of the first device is in the first group list, at 216, the access point may add the identifier of the first device to the device list, at 218. The access point may grant the access request, at 214. The method 200 may then end, at 208.

When the first passcode is not valid, at 210, the access point may determine whether the device list is expired (e.g., whether an expiration time of the device list has passed), at 220. When the access point determines that the device list is not expired, the access point may determine whether the identifier of the first device is in the device list, at 222. When the access point determines that the identifier of the first device is not in the device list (e.g., the device did not use the access point during the time period when the first passcode was valid), the access point may deny the access request, at 206. The method 200 may then end, at 208.

When the access point determines that the identifier is in the device list, at 222, the access point may send a data representing the current passcode (e.g., a second passcode that replaced the first passcode) to the first device, at 224. The second passcode may be generated by the access point based on passcode generation data. The data may include the second passcode encrypted using the first passcode so that the first device can decrypt the data using the first passcode to retrieve the second passcode. The access point may then remove the identifier of the first device from the device list, at 226, and deny the access request, at 206. The method 200 may then end, at 208. The first device may subsequently send a second access request to the access point, where the second access request is encrypted based on the second passcode.

When the access point determines that the device list is expired, at 220, the access point may determine whether the device list remains accessible, at 228. Whether or not the access point determines that the device list is accessible, the access point may deny the access request, at 206. However, if the access point determines that the device list remains accessible, the access point may remove identifiers in the device list from the first trusted devices list (e.g., the first group list), at 230. After a particular device corresponding to one of the identifiers in the device list is removed from the first trusted devices list, the access point will reject access requests from the particular device unless the particular device has the presently valid passcode.

After modifying the first trusted devices list, the access point may inhibit access to the device list, at 232. Inhibiting access to the device list may include deleting the device list from memory of the access point. The access point may deny the access request, at 206. The method 200 may then end, at 208.

Thus, the method 200 of FIG. 2 enables the access point to utilize dynamic passcodes without manually provisioning the new passcode each time the passcode is changed. A device that sends an access request encrypted based on the current passcode may have the access request granted. When the access request is encrypted based on an expired passcode, the access request is denied, but, if certain conditions are met), the access point may send the new passcode to the device. The conditions include that an identifier of the device is included in a first trusted devices list (e.g., the device is designated as a device of the first class based on the first group list 134 of FIG. 1) and in a device list, and a time period associated with the device list has not expired.

Figure 3:
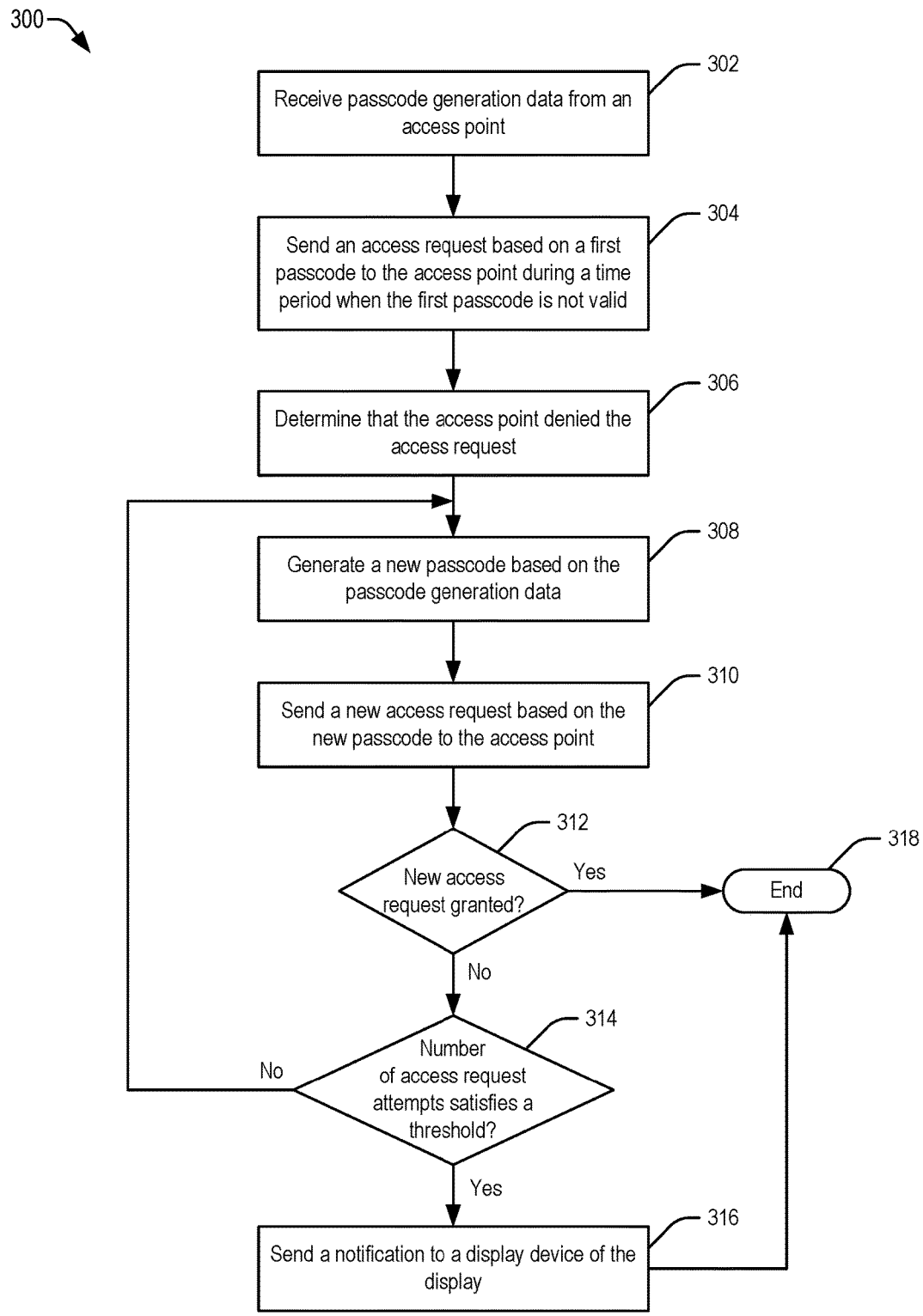
FIG. 3 is a flowchart of a second embodiment of a method of use of a wireless LAN that is secured by a wireless access point that utilizes dynamic passcodes.

Referring to FIG. 3, a flowchart of a second embodiment of a method 300 of use of a wireless LAN that is secured by a wireless access point that utilizes dynamic passcodes is shown. The method 300 may be performed by a device belonging to a second class of devices (e.g., an indefinitely trusted device, such as a device associated with an identifier in the second group list 136 of FIG. 1). Examples of devices that may be designated as indefinitely trusted devices may include devices associated with the administrator or the access point (e.g., devices of the internet of things that are associated with the administrator, mobile communication devices of employees of a business that owns the access point, etc.). Initially, the device may receive input of a first passcode to enable access to a local area network supported by the access point. For example, the first passcode may be received as manually entered input.

After the device accesses the access point using the first passcode, the administrator may designate the device as a member of the second class of devices (e.g., may designate the devise as an indefinitely trusted device). In response to the designation, the access point may store an identifier of the device in second trusted devices list, such as the second group list 136 of FIG. 1. The access point may also send passcode generation data to the device. The device receives the passcode generation data from the access point, at 302. The passcode generation data may include coefficients of a polynomial or other parameters, instructions or data usable to generate a new passcode based on a previous passcode. The access point may also have the passcode generation data and may use the passcode generation data and the first passcode to generate a new passcode (e.g., a second passcode) in preparation for expiration of the first passcode.

In an embodiment, the passcode generation data received by the device includes time data that the device uses to determine when to change the passcode. The device may change the passcode periodically (e.g., weekly, bi-weekly, monthly, or at other times) based on the time data. In another embodiment, the access point sends a change passcode instruction to each device identified in the second trusted device list when the current passcode expires or is about to expire. Each device that receives the change passcode instruction may using the passcode generation data to generate the new passcode.

In another embodiment, the indefinitely trusted devices do not know when the access point changes the passcode. In this embodiment, an indefinitely trusted device may send an access request based on the first passcode to the access point during a time period when the first passcode is not valid, at 304, and the device may determine that the access point denied the access request, at 306. For example, the device may determine that the access point denied the request when the access point does not establish a session with the device in response to the access request.

In response to a determination by the device that the access request was denied, the device may use the passcode generation data to generate a new passcode, at 308. The device may send a new access request based on the new passcode to the access point, at 310.

The device may determine whether the new access request was granted, at 312. When the device determines that the new access request was granted, the method 300 may end, at 314.

When the device determines that the new access request was denied, at 312, the device may determine whether a number of access request attempts satisfies (e.g., is equal to) a threshold (e.g., 5 access request attempts or another number of access request attempts), at 314. When the number of access request attempts does not satisfy the threshold (e.g., is less than the threshold), the method 300 may return to 308.

When the number of access request attempts satisfies the threshold, at 314, the device may send a notification (e.g., to a display device of the device or to another device, such as an administrator device), at 316. The notification may indicate that the connection attempts to the local area network supported by the access point failed and may request entry of a valid passcode. The valid passcode may be manually provisioned to the device to enable access to the local area network. The method 300 may then end, at 314.

Thus, the method 300 of FIG. 3 enables a device with a previously valid passcode to access a LAN secured by an access point that utilizes dynamic passcodes without manual entry of a new passcode when the access point changes the previously passcode to the new passcode. The device may receive passcode generation data from an access point. The device may subsequently use the passcode generation data to generate a new passcode when access to the LAN 104 is denied because the access point changed the passcode for the LAN.

Figure 4:
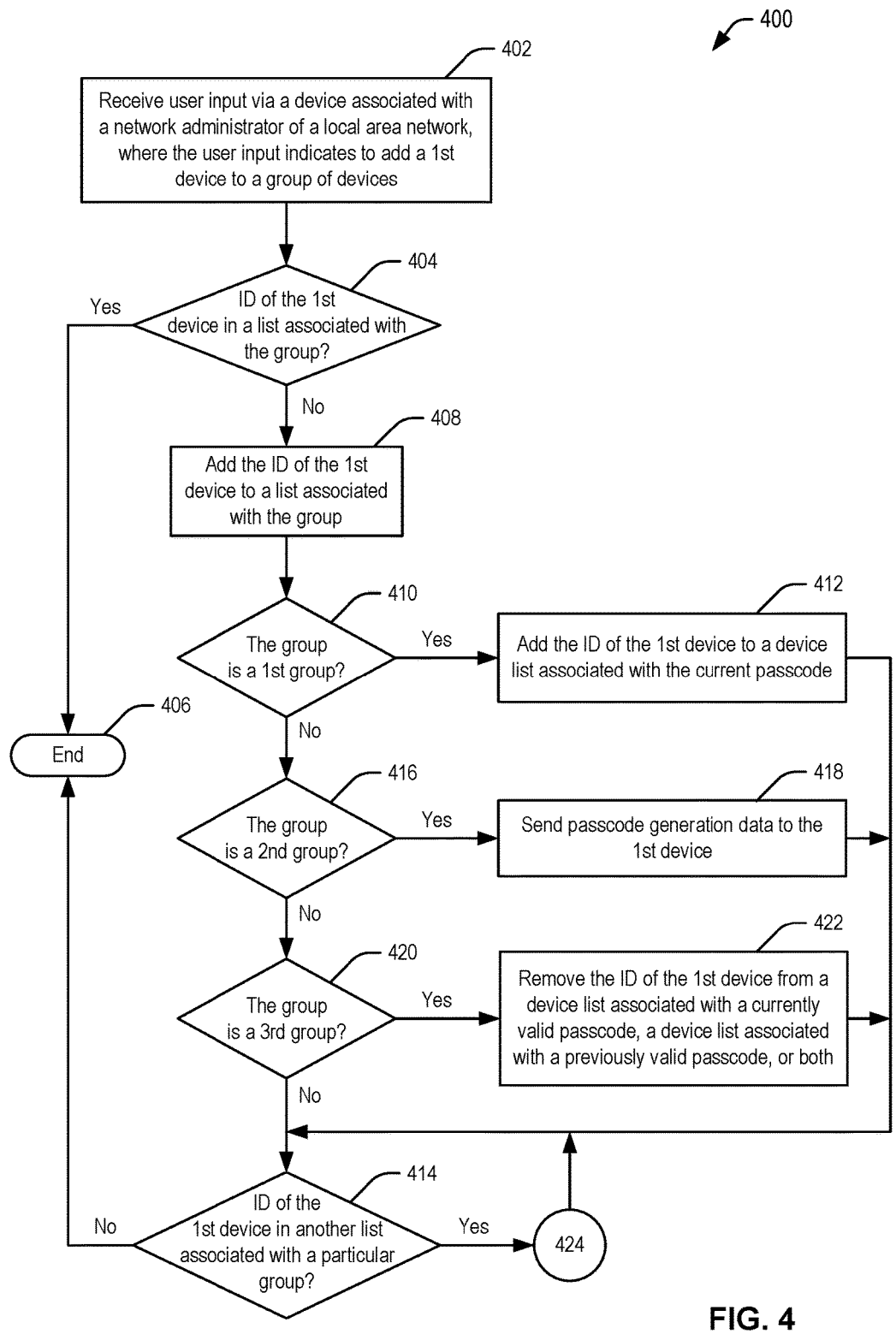
FIG. 4 is a flowchart of a third embodiment of a method of use of a wireless LAN that is secured by a wireless access point that utilizes dynamic passcodes.

Referring to FIG. 4, a flowchart of a third embodiment of a method 400 of use of a wireless LAN that is secured by a wireless access point that utilizes dynamic passcodes is shown. The method 400 may be performed by the access point 102 of FIG. 1. The access point may receive user input via a device associated with a network administrator of a local area network, at 402. The user input may indicate to add a first device to a group of devices.

The access point may determine whether an identifier of the first device is in a list associated with the group, at 404. When the identifier of the first device is in the list associated with the group, the method 400 may end, at 406. When the identifier of the first device is not in the list associated with the group, the access point may add the identifier of the first device to a list associated with the group, at 408.

The access point may determine whether the group is a first group, at 410. The first group may include devices designated by the administrator as trusted devices. When the group is the first group, the access point may add the identifier of the first device to a device list associated with a current passcode, at 412. The access point may then determine whether the identifier of the first device is in another list associated with a particular group, at 414.

When the group is not the first group, at 410, the access point may determine whether the group is a second group, at 416. The first group may include devices designated by the administrator as indefinitely trusted devices. When the group is the second group, the access point may send passcode generation data to the first device, at 418. The passcode generation data may enable the first device to generate a valid passcode from a previously valid passcode. The access point may then determine whether the identifier of the first device is in another list associated with a particular group, at 414.

When the group is not the second group, at 416, the access point may determine whether the group is a third group, at 420. The third group may be a blacklist of identifiers of devices that are prohibited from utilizing the local area network. When the group is the third group, the access point may remove the identifier of the first device from a device list associated with a currently valid passcode, a device list associated with a previously valid passcode, or both, at 422. The access point may then determine whether the identifier of the first device is in another list associated with a particular group, at 414.

Figure 5:
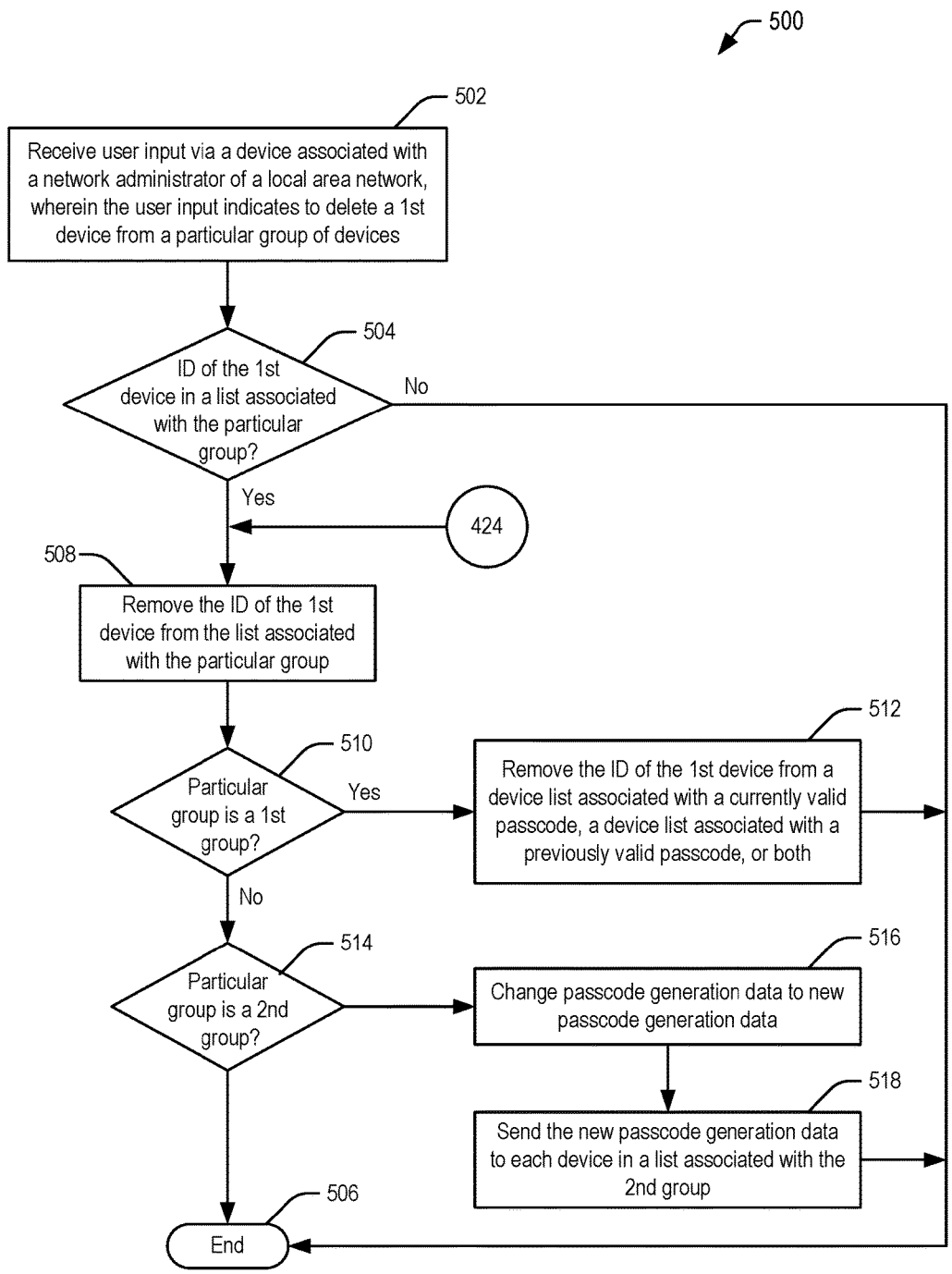
FIG. 5 is a flowchart of a fourth embodiment of a method of use of a wireless LAN that is secured by a wireless access point that utilizes dynamic passcodes.

When the access point determines that the identifier of the first device is in another list associated with a particular group, the method 400 may proceed, at 424, to a method 500 in FIG. 5. When the method 400 is returned from the method 500 of FIG. 5, the access point may determine whether the identifier of the first device is in another list associated with a particular group, at 414. When the access point determines that the identifier of the first device is not in another list associated with a particular group, at 414, the method 400 may end, at 406.

Thus, the method 400 of FIG. 4 enables an access point that utilizes dynamic passcodes for security of a LAN to enter identifiers of devices into particular lists as instructed by input received from a device associated with an administrator of the LAN. A first list may include identifiers of devices that are to receive a version of a new passcode encrypted based on a previous passcode when certain conditions are met. For example, the first list may correspond to the first group list 134 of FIG. 1. A second list may include identifiers of devices that receive passcode generation data from the access point so that the devices are able to generate a valid passcode when the access point changes the passcode for the LAN. For example, the second list may correspond to the second group list 136 of FIG. 1. A third list may include devices that are prohibited from accessing the LAN (i.e., blacklisted devices). For example, the third list may correspond to the third group list 138 of FIG. 1

Referring to FIG. 5, a flowchart of a third embodiment of the method 500 of use of a wireless LAN that is secured by a wireless access point that utilizes dynamic passcodes is shown. The method 500 may be performed by the access point 102 of FIG. 1. The access point may receive user input via a device associated with a network administrator of a local area network, at 502. The local area network may be supported by the access point. The user input may indicate to delete a first device from a particular group of devices.

The access point may determine whether an identifier of the first device is in a list associated with the particular group, at 504. When the identifier of the first device is not in the list associated with the particular group, the method 500 may end, at 506. When the identifier of the first device is in the list associated with the particular group, or when the particular group is received via the method 400 of FIG. 4, at 424; the access point may remove the identifier of the first device from the list associated with the particular group, at 508.

The access point may determine whether the particular group is a first group, at 510. The first group may include devices designated by the administrator as trusted devices. When the particular group is the first group, the access point may remove the identifier of the first device from a device list associated with a currently valid passcode, a device list associated with a previously valid passcode, or both, at 512. The method 500 may then end, at 506. At the end of the method 500, the method 500 may return to method 400 when the method 500 was entered from the method 400, at 424.

When the particular group is not the first group, at 510, the access point may determine whether the particular group is a second group, at 514. The second group may include devices designated by the administrator as indefinitely trusted devices. When the particular group is the second group, the access point may change passcode generation data to new passcode generation data, at 516. The access point may send the new passcode generation data to each device in a list of devices associated with the second group, 518. Changing the passcode generation data may inhibit the first device from generating a new passcode when a currently valid passcode expires. Sending the new passcode generation data to the devices in the list associated with the second group enables each device identified in the list to generate a valid passcode from a previous passcode. After sending the new passcode generation data, the access point may generate a new passcode.

After sending new passcode generation data or when the particular group is not the second group, at 514; the method 500 may end, at 506. At the end of the method 500, the method 500 may return to method 400 when the method 500 was entered from the method 400, at 424.

Thus, the method 500 of FIG. 5 enables an access point that utilizes dynamic passcodes for security of a LAN to remove identifiers of devices from particular lists so that the devices will not have access to a new passcode for the LAN in a particular manner or will be able to access the LAN. A device may lose an ability to receive a version of a new passcode from the access point when certain conditions are met when an identifier of the list is removed from a first trusted list (e.g., the first group list 134 of FIG. 1). A device may lose an ability to generate the new passcode from a previously valid passcode when an identifier of the device is removed from a second trusted devices list (e.g., the second group list 136 of FIG. 1). A device may gain an ability to access the LAN when an identifier of the device is removed from a blacklist (e.g., the third group list 1385 of FIG. 1).

Figure 6:
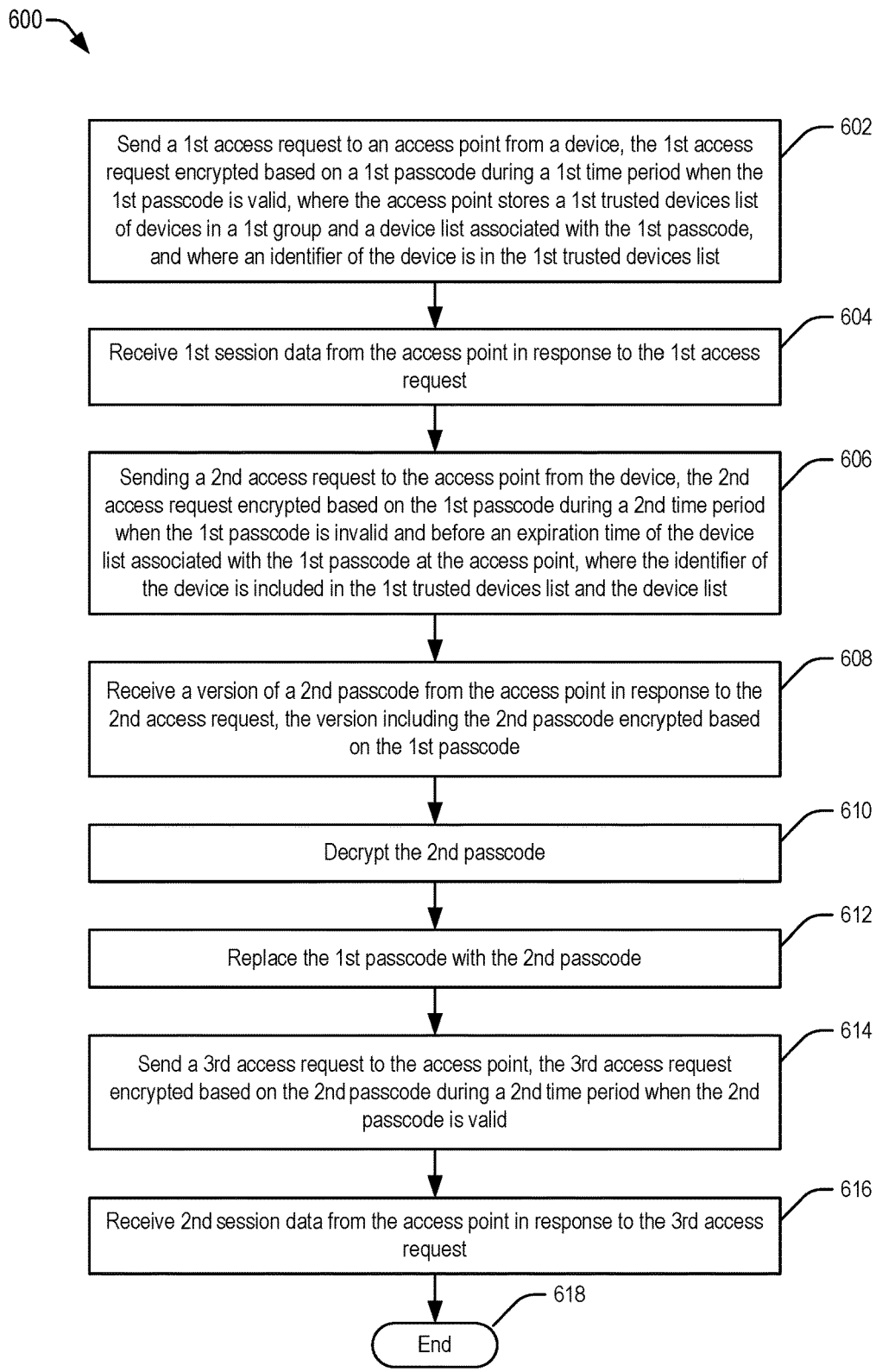
FIG. 6 is a flowchart of a fifth embodiment of a method of use of a wireless LAN that is secured by a wireless access point that utilizes dynamic passcodes.

Referring to FIG. 6, a flowchart of a fifth embodiment of a method 600 of use of a wireless LAN that is secured by a wireless access point that utilizes dynamic passcodes is shown. The method 600 may be performed by a device that has been designated as a trusted device by an administrator associated with a local area network supported by the access point (e.g., a device identified in the first group list 134 of FIG. 1). During a first time period when a first passcode is valid, the device may send a first access request to the access point, at 602. The first access request may be encrypted based on the first passcode. For example, the first access request may be part of a handshake procedure with the access point that enables establishment of a session between the device and the access point.

The first passcode may be manually entered by a user of the device or the first passcode may be retrieved from a memory of the device when the device previously accessed the LAN. Based on the first access request, the access point may determine whether an identifier associated with the first device (e.g., a MAC address) is included in a list maintained by the access point, such as a blacklist, a first group list identifying trusted devices, or a second group list identifying indefinitely trusted devices. When the identifier is not in one of the lists, the access point may send a prompt for device data to the device to obtain a device name, a user name, other information associated with the device, or a combination thereof. The access point may notify the administrator that a new device (i.e., the first device) accessed the local area network and may identify the first device by the MAC address, a portion of the MAC address, by the device data, or combinations thereof.

In response to being notified that the first device accessed the LAN, the administrator may associate the first device with a particular group (e.g., a first group of trusted devices, a second group of trusted devices, and a third group of device that are blacklisted). Alternately, the administrator may choose not to assign the first device to a particular group. When the first device is not assigned to a particular group, the first device will cease to be able to access the LAN after the access point changes the passcode unless the new passcode manually provided to the first device.

In an embodiment, the first device may be automatically associated with the first group by the access point when the new device is not associated with a particular group. The administrator may subsequently change the group associated with the new device to a different group (e.g., the second group or the third group) if desired. Additionally, the administrator of the LAN may access group lists associated with particular groups and may change or a delete an association of a particular device with a particular group. In example illustrated in FIG. 6, the first device is a member of the first group, and an identifier of the first device is included in a first group list stored by the access point.

In response to the first access request, the first device may receive first session data from the access point, at 604. The first session data may signify establishment of the session and may include information that enables the first device and the access point to communicate. Additionally, based on the first access request, the access point may add the identifier of the first device to a device list associated with the first passcode if the first device is not already identified in the device list. The device list associated with the first passcode may be associated with an expiration time. Based on the expiration time, the device list may expire at a particular time following expiration of the first passcode.

After the end of the first session, the first device may send a second access request to the access point, at 606. Since the first device has the first passcode, the second access request may be encrypted based on the first passcode. However, in the example illustrated in FIG. 6, the second request is sent after the first passcode has expired (and before expiration of the device list associated with the first passcode). In response to the second access request, access point may determine that the first device is identified in the device list. Accordingly, the access point may encrypt a new passcode (e.g. a second passcode) using the old passcode (e.g., the first passcode) and send data including the encrypted second passcode to the first device.

The first device may receive the data including the encrypted second passcode from the access point, at 608, and may decrypt the second passcode, at 610. The first device may replace the first passcode in memory with the second passcode, at 612.

After receiving and decrypting the second passcode, the first device may send a third access request to the access point, at 614. The third access request may be encrypted based on the second passcode during a time period when the second passcode is valid. The first device may receive second session data from the access point in response to the third access request, at 616. The second session data may signify establishment of a session and may include information that enables the device and the access point to communicate. The method 600 may then end, at 618.

Thus, the method 600 of FIG. 6 enables a device with a previously valid passcode to access a LAN secured by an access point that utilizes dynamic passcodes without manual entry of a new passcode when the access point changes the previously passcode to the new passcode. An identifier of the device may be included in a first group list and a device list of the access point. The device list may include identifiers of trusted devices that accessed the LAN before expiration of the previously valid passcode.

Various embodiments disclosed herein describe an access point that provides security to a LAN using dynamic passcodes. When the access point changes a previous passcode to a new passcode, first trusted devices (designated by one or more administrators as members of a first class of devices) may be able to receive a data including the new passcode encrypted based on the previous passcode for a particular period of time after the previous password becomes invalid. A devices that receive the data may be able to decrypt the data using the previous passcode to obtain the new passcode and access the LAN using the new passcode. Also, second trusted devices (designated by the one or more administrators as members of a second class of devices) may be able to generate the new passcode and use the new passcode to access the LAN. The ability of the first devices and the second devices to obtain a new passcode without needing to manually receive the new passcode may reduce a burden associated having an access point that utilizes dynamic passcodes. Being able to dynamically change the passcode for the access point for many devices that validly connect to the LAN without user intervention may remove an administrative burden associated with manually changing the passcode for each device that is able to validly connect to the LAN and may increase security of the LAN.

Figure 7:
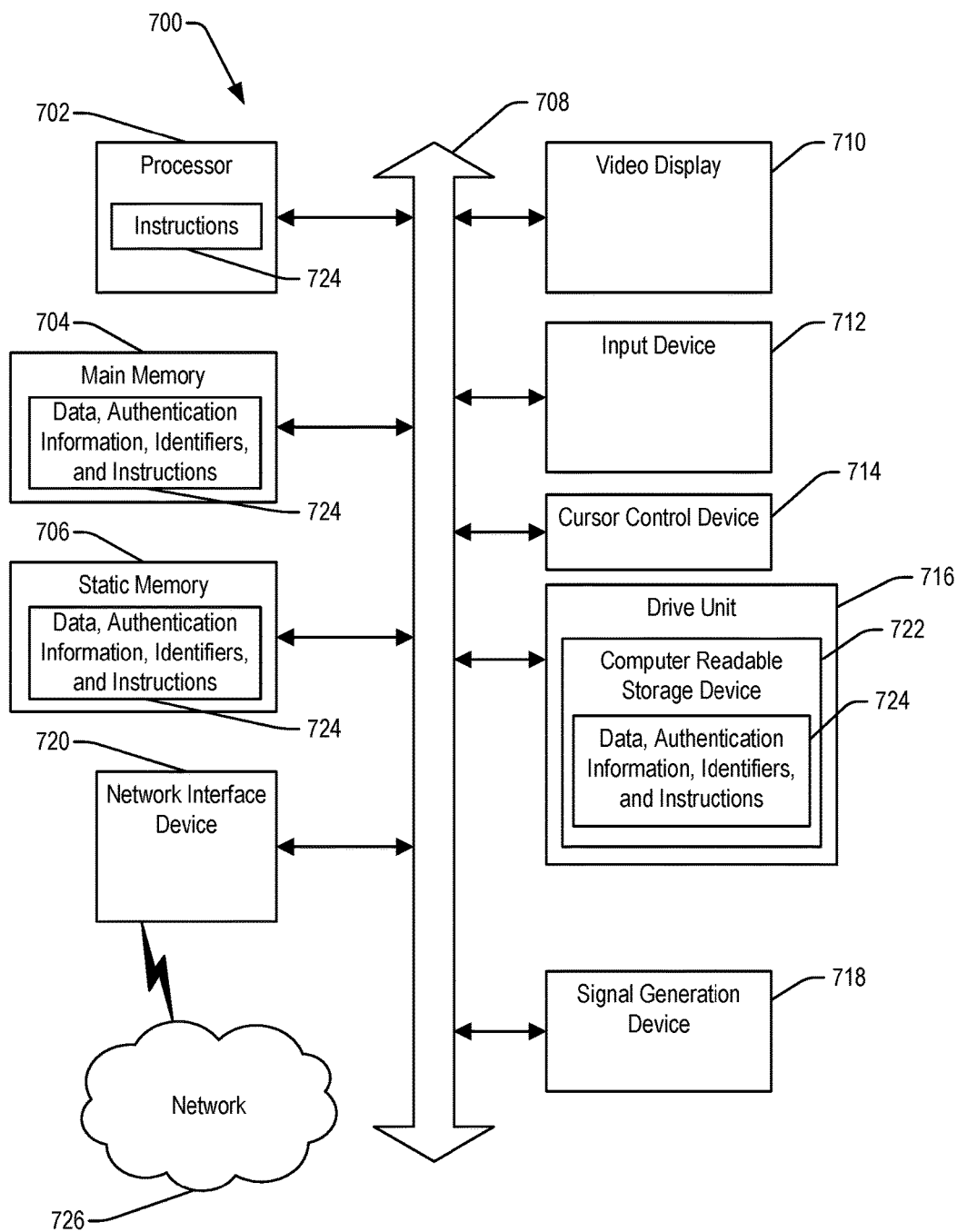
FIG. 7 is a block diagram of an illustrative embodiment of a general computer system.

Referring to FIG. 7, an illustrative embodiment of a general computer system is shown and is designated 700. The computer system 700 includes a set of instructions (e.g., the instructions 724 in the memory 704) that can be executed to cause the computer system 700 to perform any one or more of the methods or computer based functions disclosed herein. The computer system 700 may operate as a stand-alone device or may be connected (e.g., using a network) to other computer systems or peripheral devices. For example, the computer system 700 may include or may be included within any one or more of the access point 102, one or more of devices 106-114, the computer system 118, the device 150, the device 152, or combinations thereof, described with reference to FIG. 1.

In a networked deployment, the computer system 700 may operate in the capacity of a server or as a client user computer in a server-client user network environment, or as a peer computer system in a peer-to-peer (or distributed) network environment. The computer system 700 may also be implemented as or incorporated into various devices, such as a server, a network device, a mobile device, a palmtop computer, a laptop computer, a desktop computer, a communications device, a wireless telephone, a personal computer (PC), a tablet PC, a personal digital assistant (PDA), a set-top box (STB) device, a media playback device, a customer premises equipment device, an endpoint device, a web appliance, or any other machine capable of executing a set of instructions (sequential or otherwise) that specify actions to be taken by that machine. In a particular embodiment, the computer system 700 may be implemented using electronic devices that provide video, audio, data communication, or combinations thereof. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702 (e.g., a central processing unit (CPU), a graphics processing unit (GPU), or both). Moreover, the computer system 700 may include a main memory 704 and a static memory 706, which can communicate with each other via a bus 708. As shown, the computer system 700 may further include a video display unit 710, such as a liquid crystal display (LCD), a light emitting diode (LED) display, a touch screen display, a flat panel display, a solid state display, or a lamp assembly of a projection system. Additionally, the computer system 700 may include an input device 712, such as a remote control device (e.g., a television remote or a set-top box remote), a keyboard, a joystick, another type of input device, or combinations thereof. In addition, the computer system 700 may include a cursor control device 714 (e.g., a mouse). In some embodiments, the input device 712 and the cursor control device 714 may be integrated into a single device, such as a capacitive touch screen input device. The computer system 700 may also include a drive unit 716, a signal generation device 718, such as a speaker or remote control, and a network interface device 720. Some computer systems 700 may not include an input device (e.g., a server may not include an input device).

In a particular embodiment, as depicted in FIG. 7, the drive unit 716 may include a computer-readable storage device 722 in which authentication information, identifiers, and one or more sets of instructions 724, e.g. software, can be embedded. The computer-readable storage device 722 may be random access memory (RAM), read-only memory (ROM), programmable read-only memory (PROM), erasable PROM (EPROM), electrically erasable PROM (EEPROM), one or more registers, solid-state memory, one or more hard disks, one or more removable disks, compact disc read-only memory (CD-ROM), other optical disk storage, magnetic disk storage, magnetic storage devices, or any other storage device usable to store program code in the form of instructions or data and that can be accessed by a computer and/or a processor. A computer-readable storage device is not a signal.

Further, the instructions 724 may embody one or more of the methods or logic as described herein. The instructions 724 may be executable by the processor 702 to perform one or more functions or methods described herein, such as the methods 200, 300, 400, 500, and 600 described with reference to FIGS. 2-6, respectively. In a particular embodiment, data, authentication information, identifiers, and instructions (e.g., instructions to use passcode generation data) 724 may reside completely, or at least partially, within the main memory 704, the static memory 706, and/or within the processor 702 during execution by the computer system 700. The main memory 704 and the processor 702 also may include a computer-readable storage device. The authentication information included in the authentication information, identifiers, and instructions 724 in the drive unit 716, the main memory 704, the static memory 706, the processor 702, or combinations thereof may be transmitted to another computer system to enable authentication of the computer system 700, and the identifiers may include a list of identifiers used to authenticate the other computer system, prior to sharing a resource with the other computer system.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality described herein. It is further noted that a computing device, such as a processor, a controller, a state machine or other suitable device for executing instructions to perform operations may perform such operations directly or indirectly by way of one or more intermediate devices directed by the computing device.

The computer system 700 may communicate with one or more external systems via a network 726. First data stored by the computer-readable storage device 722 may be sent to the one or more external systems via the network 726. Also, second data may be received by the computer system 700 via the network 726. The second data may be stored by the processor 702 at the computer-readable storage device. Additionally, while the computer-readable storage device 722 is shown to be a single device, the computer-readable storage device 722 may be a single device or may be multiple devices, such as a centralized or distributed database, and/or associated caches and servers that store one or more sets of instructions. The computer-readable storage device 722 is capable of storing a set of instructions for execution by the processor 702 to cause the computer system 700 to perform any one or more of the methods or operations disclosed herein.

In a particular non-limiting, exemplary embodiment, the computer-readable storage device 722 may include a solid-state memory such as embedded memory (or a memory card or other package that houses one or more non-volatile read-only memories). Further, the computer-readable storage device 722 may include a random access memory or other volatile re-writable memory. Additionally, the computer-readable storage device 722 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for short-range communications and long-range communications can be used by the computer system 700 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
during a usage period of a first passcode that enables access to a network and for an initial access request during the usage period for each user device that sends a valid access request to access the network based on the first passcode during the usage period, adding, at an access point, an identifier of the user device to a device list for the first passcode;
after expiration of the first passcode, receiving, at the access point, a first access request from a first device, the first access request encrypted based on the first passcode;
in response to the first access request and before expiration of a usage time of the device list for the first passcode, determining at the access point, whether an identifier of the first device is included in the device list for the first passcode; and
in response to the determining indicating that the identifier of the first device is included in the device list for the first passcode:
generating, at the access point, data representing a second passcode by encrypting the second passcode based on the first passcode;
sending the data representing the second passcode to the first device from the access point; and
removing, at the access point, the identifier for the first device from the device list for the first passcode.

2. The method of claim 1, further comprising:
before the expiration of the first passcode, receiving a second access request from the first device, the second access request encrypted based on the first passcode;
determining, based on the second access request, whether the identifier of the first device is included in a trusted devices list; and
in response to the trusted devices list including the identifier of the first device, enabling the identifier of the first device to be included in the device list for the first passcode.

3. The method of claim 2, wherein the trusted devices list includes identifiers of devices designated as trusted devices by an administrator of a local area network supported by the access point.

4. The method of claim 2, further comprising, in response to expiration of the usage time of the device list for the first passcode:
removing, from the trusted devices list, first identifiers corresponding to the identifiers in the device list; and
inhibiting subsequent access to the device list for the first passcode.

5. The method of claim 4, wherein the inhibiting subsequent access to the device list for the first passcode comprises deleting the device list for the first passcode from a memory of the access point.

6. The method of claim 2, further comprising, in response to the trusted devices list not including the identifier of the first device, blocking addition of the identifier of the first device to the device list for the first passcode.

7. The method of claim 1, further comprising, after the expiration of the first passcode and during the usage time of the device list for the first passcode:
receiving, at the access point, a second access request from a second device, the second access request encrypted based on the first passcode; and
in response to a second determination that an identifier of the second device is not included in the device list for the first passcode, denying the second access request.

8. The method of claim 1, further comprising, after the expiration of the first passcode and the expiration of the usage time of the device list for the first passcode:
receiving a second access request, the second access request based on the first passcode; and
denying the second access request.

9. The method of claim 1, further comprising:
receiving, from a device associated with an administrator of a local area network supported by the access point, an indication to add a particular device to a trusted devices list for devices configured to generate updated passcodes; and
responsive to the indication, sending passcode generation data to the particular device, wherein the passcode generation data enables the particular device to generate a valid passcode based on a previously valid passcode.

10. The method of claim 1, wherein the access point generates the second passcode by applying a polynomial to the first passcode.

11. A system comprising:
a processor of an access point;
a memory coupled to the processor, the memory including instructions executable by the processor to perform operations, the operations including:
during a usage period of a first passcode that enables access to a network and for an initial access request during the usage period for each user device that sends a valid access request to access the network based on the first passcode during the usage period, adding an identifier of the user device to a device list for the first passcode;
after expiration of the first passcode, receiving, from a first device, a first access request to access a local area network, the first access request encrypted based on the first passcode;
in response to the first access request and before expiration of a usage time of the device list for the first passcode, determining whether an identifier of the first device is included in the device list for the first passcode; and
in response to the determining indicating that the identifier of the first device is included in the device list for the first passcode:
generating data representing a second passcode by encrypting the second passcode based on the first passcode;
sending the data representing the second passcode to the first device; and
removing, at the access point, the identifier for the first device from the device list for the first passcode.

12. The system of claim 11, wherein the operations further include:
receiving, from a device associated with a network administrator of the local area network, a first instruction to add an identifier associated with a second device to a trusted devices list; and
based on the first instruction, adding the identifier of the second device to the trusted devices list.

13. The system of claim 11, wherein the operations further include:
receiving, from a device associated with a network administrator of the local area network, a first instruction to add an identifier associated with a third device to a trusted devices list for devices configured to generate updated passcodes; and
based on the first instruction, sending first passcode generation data to the third device, wherein the first passcode generation data enables the third device to generate a valid passcode based on a previously valid passcode.

14. The system of claim 13, wherein the operations further include:
in response to a determination to remove an entry for a particular device from the trusted devices list for devices configured to generate updated passcodes:
sending second passcode generation data to each device identified in the trusted devices list after removal of the entry for the particular device from the trusted devices list; and
generating a new passcode using the second passcode generation data and a previous passcode, wherein the new passcode cannot be generated using the first passcode generation data and the previous passcode.

15. A processor-readable storage device storing instructions that, when executed by a processor of an access point, cause the processor to perform operations, the operations comprising:
during a usage period of a first passcode that enables access to a network and for an initial access request during the usage period for each user device that sends a valid access request to access the network based on the first passcode during the usage period, adding an identifier of the user device to a device list for the first passcode;
after expiration of the first passcode, receiving a first access request from a first device, the first access request encrypted based on the first passcode;
in response to the first access request and before expiration of a usage time of the device list for the first passcode, determining whether that an identifier of the first device is included in the device list for the first passcode; and
in response to the determining indicating that the identifier of the first device is included in the device list for the first passcode:
generating data representing a second passcode by encrypting the second passcode based on the first passcode;
sending the data representing the second passcode to the first device; and
removing, at the access point, the identifier for the first device from the device list for the first passcode.

16. The processor-readable storage device of claim 15, wherein the operations further comprise:
before the expiration of the first passcode, receiving a second access request from the first device, the second access request encrypted based on the first passcode;

determining, based on the second access request, whether the identifier of the first device is included in a trusted devices list; and in response to the trusted devices list including the identifier of the first device, enabling the identifier of the first device to be included in the device list for the first passcode.

17. The processor-readable storage device of claim 16, wherein the operations further comprise:

in response to expiration of the usage time of the device list for the first passcode:

removing, from the trusted devices list, first identifiers corresponding to the identifiers in the device list for the first passcode; and inhibiting subsequent access to the device list for the first passcode.

18. The processor-readable storage device of claim 15, wherein the operations further comprise, in response to the determining that the identifier of the first device is included in the device list for the first passcode, deleting an entry associated with the first device from the device list for the first passcode.

19. The processor-readable storage device of claim 15, wherein the first access request is a portion of a handshake procedure.

20. The processor-readable storage device of claim 15, wherein each device identified in the device list for the first passcode is also identified in a trusted devices list.

* * * * *